United States Patent
Mukawa et al.

(10) Patent No.: US 12,504,548 B2
(45) Date of Patent: Dec. 23, 2025

(54) MEASURING DEVICE, MEASURING METHOD, MEASURING SYSTEM, AND RADIATION THERAPY SYSTEM

(71) Applicant: SUMITOMO HEAVY INDUSTRIES, LTD., Tokyo (JP)

(72) Inventors: Tetsuya Mukawa, Yokosuka (JP); Hiroki Tanaka, Kyoto (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 244 days.

(21) Appl. No.: 18/314,510

(22) Filed: May 9, 2023

(65) Prior Publication Data

US 2023/0314632 A1    Oct. 5, 2023

Related U.S. Application Data (63) Continuation of application No. PCT/JP2021/041112, filed on Nov. 9, 2021.

(51) Int. Cl.
| | | |
|---|---|---|
| *G01T 1/185* | (2006.01) | |
| *A61N 5/10* | (2006.01) | |
| *G01T 1/20* | (2006.01) | |
| *G01T 3/00* | (2006.01) | |

(52) U.S. Cl.
CPC ............ *G01T 1/185* (2013.01); *A61N 5/1071* (2013.01); *G01T 1/201* (2013.01); *G01T 1/2018* (2013.01); *G01T 3/008* (2013.01); *A61N 2005/109* (2013.01)

(58) Field of Classification Search
None
See application file for complete search history.

(56) References Cited

U.S. PATENT DOCUMENTS

| | | | | |
|---|---|---|---|---|
| 2,288,718 | A | * | 7/1942 | Hartmut ................. H01J 47/12 313/93 |
| 3,566,118 | A | * | 2/1971 | Peters ..................... G01T 1/20 250/367 |
| 2017/0108591 | A1 | | 4/2017 | Kuri et al. |
| 2018/0250528 | A1 | | 9/2018 | Liu et al. |
| 2019/0255353 | A1 | | 8/2019 | Heibel |
| 2022/0128722 | A1 | | 4/2022 | Liu et al. |

FOREIGN PATENT DOCUMENTS

| | | |
|---|---|---|
| JP | H04-004549 A | 1/1992 |
| JP | 2016-003892 A | 1/2016 |
| JP | 2016-166777 A | 9/2016 |
| JP | 2018-529437 A | 10/2018 |

OTHER PUBLICATIONS

International Search Report of PCT/JP2021/041112 Mailed on Jan. 18, 2022.

* cited by examiner

*Primary Examiner* — Edwin C Gunberg
(74) *Attorney, Agent, or Firm* — WTA IP Law P.C.

(57) ABSTRACT

A measuring device includes an ionization chamber where air is contained and a measurement value relating to radiation including a neutron ray and a gamma ray is measured, a detector that detects a detection value relating to the neutron ray, and a controller that calculates a dose of the gamma ray based on the measurement value measured in the ionization chamber and the detection value detected by the detector.

12 Claims, 7 Drawing Sheets

MEASURING DEVICE, MEASURING METHOD, MEASURING SYSTEM, AND RADIATION THERAPY SYSTEM

CROSS-REFERENCE TO RELATED APPLICATIONS

This application is a bypass continuation of International PCT Application No. PCT/JP2021/041112, filed on Nov. 9, 2021, which claims priority to Japanese Patent Application No. 2020-188664, filed on Nov. 12, 2020, which are incorporated by reference herein in their entirety.

BACKGROUND

Technical Field

A certain embodiment of the present invention relates to a measuring device, a measuring method, a measuring system, and a radiation therapy system.

Description of Related Art

In recent years, there is a technique in which therapy is performed by using a neutron ray. For example, as a neutron capture therapy that emits a neutron ray to kill a cancer cell, a boron neutron capture therapy (BNCT) using a boron compound is known. In the boron neutron capture therapy, boron that has been previously incorporated into the cancer cell is irradiated with the neutron ray, and the cancer cell is selectively destroyed by scattering of a heavily charged particle generated by the irradiation.

In order to measure an amount of the neutron ray used for the therapy in this manner, for example, a neutron ray measuring device shown in the related art is used. In the neutron ray measuring device disclosed in the related art, a detection unit detects the neutron ray, and the amount of the neutron ray is calculated based on the detection result.

SUMMARY

According to an embodiment of the present invention, there is provided a measuring device that includes an ionization chamber where air is contained and a measurement value relating to radiation including a neutron ray and a gamma ray is measured, a detector that detects a detection value relating to the neutron ray, and a controller that calculates a dose of the gamma ray based on the measurement value measured in the ionization chamber and the detection value detected by the detector.

According to another embodiment of the present invention, there is provided a measuring method that includes calculating, based on a measurement value relating to radiation including a neutron ray and a gamma ray, which is measured in an ionization chamber containing air inside, and a detection value relating to the neutron ray, which is detected by a detector, a dose of the gamma ray.

According to still another embodiment of the present invention, there is provided a measuring system that includes a radiation therapy apparatus that emits radiation including a neutron ray and a gamma ray, and a measuring device including an ionization chamber where air is contained and a measurement value relating to the radiation including the neutron ray and the gamma ray is measured, a detector that detects a detection value relating to the neutron ray, and a controller that calculates a dose of the gamma ray based on the measurement value measured in the ionization chamber and the detection value detected by the detector.

According to still another embodiment of the present invention, there is provided a radiation therapy system that includes a radiation therapy apparatus that emits radiation including a neutron ray and a gamma ray, and a measuring device including an ionization chamber where air is contained and a measurement value relating to the radiation including the neutron ray and the gamma ray is measured, a detector that detects a detection value relating to the neutron ray, and a controller that calculates a dose of the gamma ray based on the measurement value measured in the ionization chamber and the detection value detected by the detector. The radiation therapy apparatus controls the emission of the radiation by using the dose of the gamma ray calculated by the measuring device.

DETAILED DESCRIPTION

Here, when the neutron ray is generated from a charged particle beam in the neutron capture therapy, a gamma ray is also generated. In order to ensure the quality of beam emitted in the neutron capture therapy, it is necessary to appropriately measure not only a dose of the neutron ray but also a dose of the gamma ray. In a gamma-ray measuring method in the related art, for example, ionization chambers filled with two types of gases and having different sensitivities are used to measure the gamma ray. However, in such a measuring method, a process relating to the measurement becomes complicated due to a need for a facility for filling the ionization chamber with the gas and thus manpower increases. Therefore, it has been required to easily measure the dose of the gamma ray.

It is desirable to provide a measuring device, a measuring method, a measuring system, and a radiation therapy system capable of easily measuring a dose of a gamma ray.

The measuring device calculates the dose of gamma rays based on the measurement value relating to the radiation measured in the ionization chamber and the detection value detected by the detector. Since the measurement value is measured in the ionization chamber containing the air, the measurement value can be easily measured without separately providing a facility for filling the ionization chamber with gas. Further, the measuring device can remove the influence of the value relating to the neutron ray from the measurement value by using the neutron count. As described above, the measuring device can easily measure the dose of the gamma ray. Further, the measuring device can easily measure the dose of the neutron ray.

In one embodiment, the measurement value may include a first ionization amount due to a reaction between the air in the ionization chamber and the neutron ray and a second ionization amount due to a reaction between the air in the ionization chamber and the gamma ray, and the dose of the gamma ray may be calculated based on the second ionization amount. In this case, it is possible to derive the second ionization amount based on the measurement value, the first ionization amount, and the neutron count and thus appropriately measure the dose of the gamma ray.

In one embodiment, the detection value may be a neutron count relating to the neutron ray, and the first ionization amount may be approximated to an ionization amount due to a reaction between nitrogen contained in the air in the ionization chamber and the neutron ray. In this case, the ionization amount due to the reaction between the nitrogen and the neutron ray is proportional to the neutron count, and thus the first ionization amount can be regarded as being proportional to the neutron count. Therefore, the first ionization amount is calculated based on the neutron count. Accordingly, it is possible to derive the second ionization amount by removing the first ionization amount from the measurement value and thus appropriately measure the dose of the gamma ray.

According to the measuring method, it is possible to obtain the same action and effect as those of the above measuring device.

According to the measuring system, in the measuring device, the dose of the gamma ray is calculated based on the measurement value relating to the radiation emitted from the radiation therapy apparatus and the detection value relating to the neutron ray emitted from the radiation therapy apparatus. Since the measurement value is measured in the ionization chamber containing the air, the measurement value can be easily measured without separately providing a facility for filling the ionization chamber with gas. Further, the measuring device can remove the influence of the value relating to the neutron ray from the measurement value by using the neutron count. As described above, in the measuring system, the dose of the gamma ray of the radiation therapy apparatus can be easily measured by the measuring device. Further, in the measuring system, the dose of the neutron ray of the radiation therapy apparatus can be easily measured by the measuring device.

According to the radiation therapy system, in the measuring device, the dose of the gamma ray is calculated based on the measurement value relating to the radiation emitted from the radiation therapy apparatus and the detection value relating to the neutron ray emitted from the radiation therapy apparatus. Since the measurement value is measured in the ionization chamber containing the air, the measurement value can be easily measured without separately providing a facility for filling the ionization chamber with gas. Further, the measuring device can remove the influence of the value relating to the neutron ray from the measurement value by using the neutron count. Accordingly, the dose of the gamma ray of the radiation therapy apparatus is easily measured by the measuring device. Further, the dose of the neutron ray of the radiation therapy apparatus is easily measured by the measuring device. With the control of the emission of the radiation including the neutron ray and the gamma ray by using at least one of the dose of the neutron ray and the dose of the gamma ray measured by the measuring device, the radiation therapy apparatus can emit, to a patient, an appropriate dose of radiation. Further, the radiation therapy apparatus can suppress emission, to the patient, of radiation including at least one of the neutron ray and the gamma ray having a dose exceeding a predetermined threshold.

Hereinafter, preferred embodiments of the present disclosure will be described in detail with reference to drawings.

Figure 1:
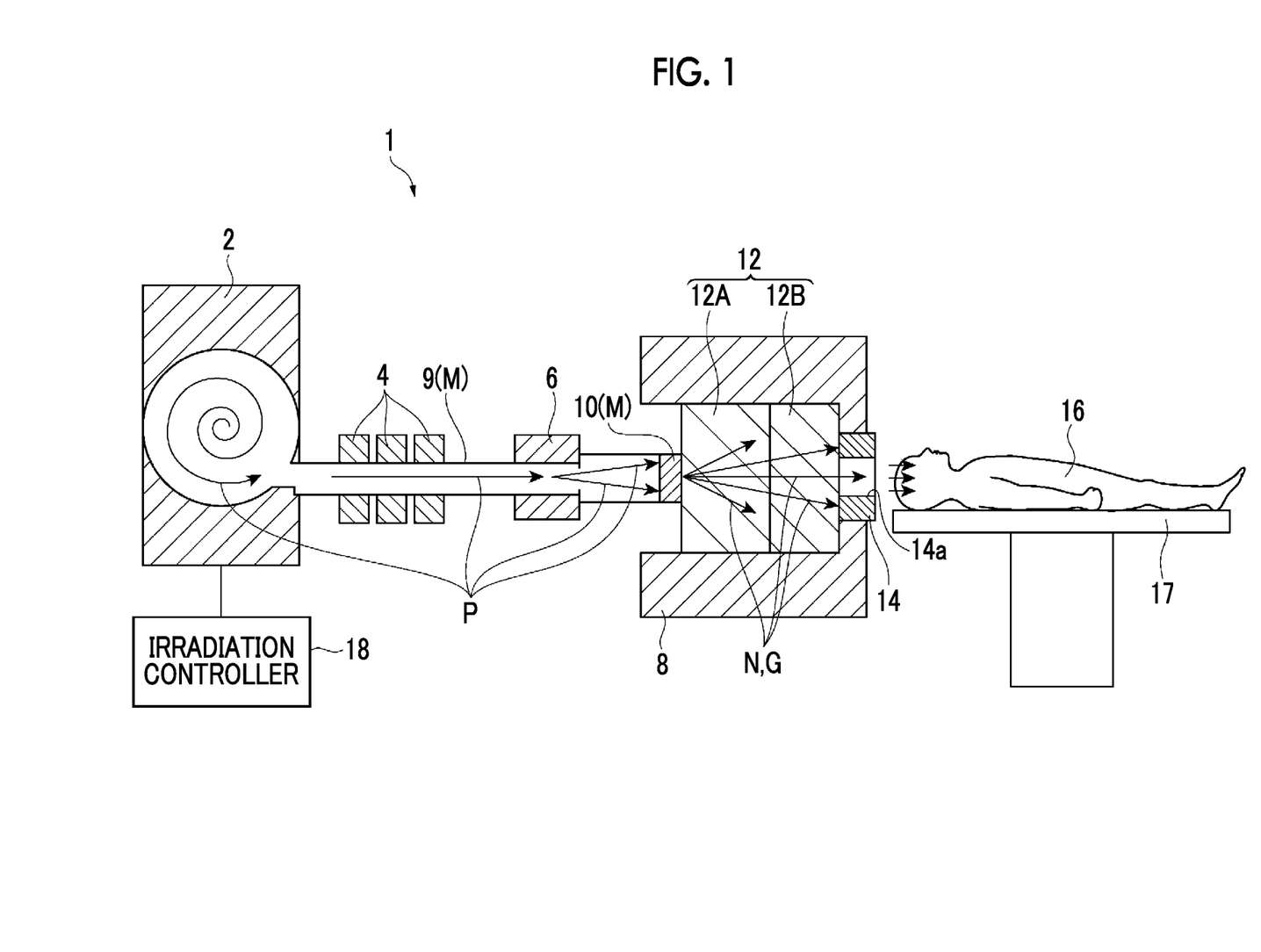
FIG. 1 is a schematic view of a neutron capture therapy apparatus that is an example of a radiation therapy apparatus according to an embodiment.

A measuring system according to the embodiment of the present disclosure includes a radiation therapy apparatus and a measuring device. The measuring device calculates a dose of a gamma ray. The measuring device calculates, for example, a dose of a neutron ray and the dose of the gamma ray emitted by the radiation therapy apparatus. The radiation therapy apparatus is, for example, a neutron capture therapy apparatus. First, an outline of the neutron capture therapy apparatus that generates the neutron ray and the gamma ray to be measured by the measuring device will be described with reference to FIG. 1. FIG. 1 is a schematic view of the neutron capture therapy apparatus that is an example of the radiation therapy apparatus. A neutron capture therapy apparatus 1 (example of radiation therapy apparatus) shown in FIG. 1 performs cancer therapy using a boron neutron capture therapy (BNCT). The neutron capture therapy apparatus 1 emits, to a patient 16 (emission target), a charged particle beam P (example of radiation) including a neutron ray N and a gamma ray G. In the neutron capture therapy apparatus 1, for example, a tumor of the patient 16 to which boron ($^{10}B$) is administered is irradiated with the neutron ray N.

The neutron capture therapy apparatus 1 includes an accelerator 2. The accelerator 2 accelerates a charged particle such as an anion and emits the charged particle beam P. The accelerator 2 is configured by, for example, a cyclotron. In the present embodiment, the charged particle beam P is a proton beam generated by stripping a charge from an anion. The accelerator 2 generates, for example, the charged particle beam P having a beam radius of 40 mm and 60 kW (=30 MeV×2 mA). The accelerator is not limited to the cyclotron, and may be a synchrotron, a synchro-cyclotron, a linear accelerator, an electrostatic accelerator, or the like.

The charged particle beam P emitted from the accelerator 2 is sent to a neutron ray generating unit M provided in the neutron capture therapy apparatus 1. The neutron ray generating unit M includes a beam duct 9 and a target 10. The charged particle beam P emitted from the accelerator 2 passes through the beam duct 9 and travels toward the target 10 disposed at an end portion of the beam duct 9. A plurality of quadrupole electromagnets 4 and a scanning electromagnet 6 are provided along the beam duct 9. The plurality of quadrupole electromagnets 4 adjust a beam axis of the charged particle beam P by using, for example, an electromagnet.

The scanning electromagnet 6 scans the charged particle beam P and controls irradiation of the target 10 with the charged particle beam P. The scanning electromagnet 6 controls an irradiation position of the charged particle beam P with respect to the target 10.

In the neutron capture therapy apparatus 1, the target 10 is irradiated with the charged particle beam P to generate the neutron ray N and the neutron ray N is emitted to the patient 16 disposed on an examination table 17. The neutron capture therapy apparatus 1 includes the target 10, a shield member 8, a deceleration member 12, a collimator 14, and an irradiation controller 18.

The target 10 is irradiated with the charged particle beam P to generate radiation including the neutron ray N and the gamma ray G. The gamma ray G is generated with the generation of the neutron ray N. The target 10 is a solid-shaped member formed of a material that generates the neutron ray and the gamma ray when irradiated with charged particle beam. Specifically, the target 10 is formed of, for example, beryllium (Be), lithium (Li), tantalum (Ta), or tungsten (W), and has, for example, a disk-shaped solid shape having a diameter of 160 mm. The target 10 is not limited to the disk shape and may have another shape.

The deceleration member 12 decelerates the neutron ray N generated by the target 10 (decreases energy of neutron ray N). The deceleration member 12 may have a laminated structure including a layer 12A that mainly decelerates a fast neutron contained in the neutron ray N and a layer 12B that mainly decelerates an epithermal neutron contained in the neutron ray N.

The shield member 8 shields the generated neutron ray N, gamma ray G, and the like from being emitted to the outside. The shield member 8 is provided so as to surround the deceleration member 12. An upper portion and a lower portion of the shield member 8 extend to an upstream side of the charged particle beam P from the deceleration member 12.

The collimator 14 shapes an irradiation field of the neutron ray N and has an opening 14a through which the neutron ray N passes. The collimator 14 is, for example, a block-shaped member having the opening 14a at the center.

The irradiation controller 18 controls the irradiation of the charged particle beam P. The irradiation controller 18 uses a gamma dose calculated by the measuring device described below to control the irradiation of the charged particle beam P (radiation) including the neutron ray and the gamma ray. The irradiation controller 18 controls, for example, the dose of the charged particle beam P emitted from the accelerator 2. Details will be described below.

Figure 2:
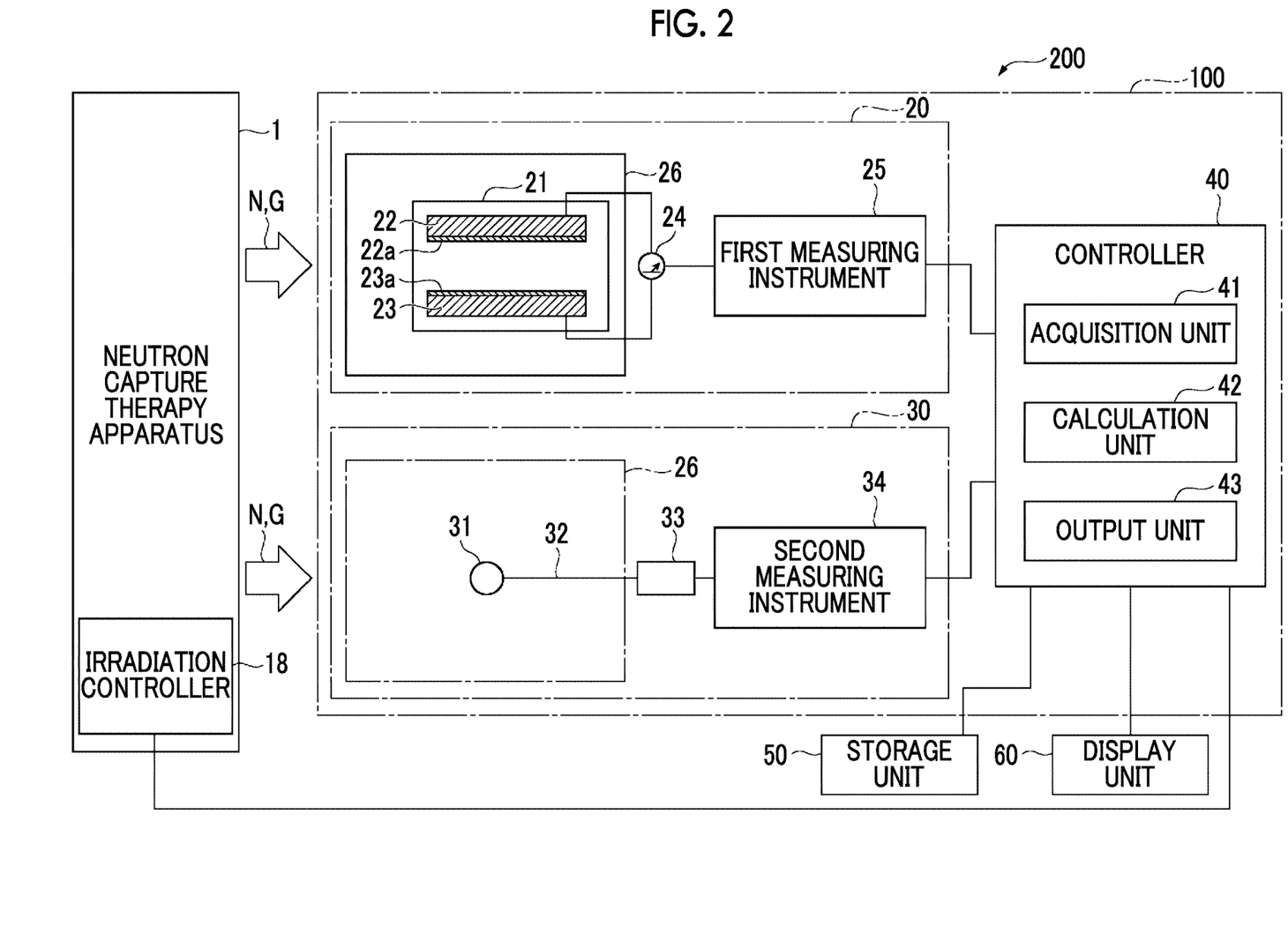
FIG. 2 is a block diagram of a measuring system and a measuring device according to an embodiment.

Next, a detailed configuration of the measuring device included in the measuring system will be described with reference to FIG. 2. FIG. 2 is a block diagram of the measuring system and the measuring device according to the embodiment. As shown in FIG. 2, a measuring system 200 (an example of the measuring system and the radiation therapy system) includes the neutron capture therapy apparatus 1 and a measuring device 100. The measuring device 100 calculates a dose (amount) of the gamma ray G generated by the irradiation of the target 10 with the charged particle beam P in the neutron capture therapy apparatus 1. For example, the measuring device 100 also calculates a dose (amount) of the neutron ray N generated by the irradiation of the target 10 with the charged particle beam P in the neutron capture therapy apparatus 1. The measuring device 100 in the measuring system 200 calculates, for example, each dose of the neutron ray N and the gamma ray G emitted from the opening 14a of the collimator 14 of the neutron capture therapy apparatus 1. For example, the measuring device 100 is provided on a downstream side of the neutron ray N from the opening 14a of the collimator 14 in a state where there is no patient 16 on the examination table 17.

For example, the measuring device 100 outputs, to the storage unit 50 or the display unit 60, each dose or a measurement result of the gamma ray G and the neutron ray N generated in the neutron capture therapy apparatus 1. The storage unit 50 is a functional unit that functions as a database storing each piece of information. The storage unit 50 is formed by, for example, a database including at least one of a memory or a storage, a server, or another suitable medium. The display unit 60 is a functional unit that displays input information. The display unit 60 is, for example, a display.

As shown in FIG. 2, the measuring device 100 includes a measurement unit 20 (example of ionization chamber), a detection unit 30 (example of detector), and a controller 40. The measuring device 100 performs a measurement process on the neutron ray N and the gamma ray G in the measurement unit 20 and a detection process on the neutron ray N in the detection unit 30. For example, the measurement process in the measurement unit 20 and the detection process in the detection unit 30 are performed at different timings using the same water phantom 26.

The measurement unit 20 is a device that measures a measurement value relating to the radiation including the neutron ray N and the gamma ray G. The measurement unit 20 measures measurement values relating to the neutron ray N and the gamma ray G. For example, in the neutron capture therapy apparatus 1, the measurement unit 20 is provided on a downstream side of the charged particle beam P from the target 10. Accordingly, the measurement value of the present embodiment is configured of the measurement value relating to the neutron ray N and the measurement value relating to the gamma ray G. The measurement unit 20 is configured by, for example, an ionization chamber. The measurement unit 20 of the present embodiment is the ionization chamber containing air inside, and is a so-called air ionization chamber. The measurement unit 20 performs the measurement based on a measurement control signal from the controller 40.

Specifically, the measurement unit 20 includes a chamber body 21 whose inside is filled with the air, a pair of electrodes 22 and 23 provided to face each other inside the chamber body 21, a current measurement unit 24 that measures a current generated between the pair of electrodes 22 and 23, and a first measuring instrument 25 that calculates a measurement value from a measurement result by the current measurement unit 24. The measurement of the measurement value in the measurement unit 20 is performed by using the water phantom 26. That is, the neutron ray N and the gamma ray G from the neutron capture therapy apparatus 1 are emitted to the water phantom 26. For example, the chamber body 21 and the pair of electrodes 22 and 23 are provided inside the water phantom 26. The chamber body 21 and the pair of electrodes 22 and 23 are disposed at predetermined positions in the water phantom 26.

For example, the inside of the chamber body 21 is exposed to the atmosphere through a conduit extending to the outside of the water phantom 26. The air in the chamber body 21 contains, for example, nitrogen and oxygen. The inside of the chamber body 21 may be filled with only a gas configured of nitrogen. The pair of electrodes 22 and 23 is formed of a thin metal plate such as copper. Facing surfaces, which are facing each other, of the pair of electrodes 22 and 23 are covered with films 22a and 23a. A power supply is connected between the pair of electrodes 22 and 23, and a high-voltage electric field is applied. The current measurement unit 24 is electrically connected to the pair of electrodes 22 and 23. The current measurement unit 24 measures a current value applied between the pair of electrodes 22 and 23.

With such a configuration, when the neutron ray N and the gamma ray G pass through the measurement unit 20, the neutron ray N and the gamma ray G collide with molecules constituting the air, and the molecules are ionized. Since the electric field is applied between the pair of electrodes 22 and 23, an ionized electron e− is collected on one electrode 23 and an ion i+ is collected on the high-voltage electrode 22. Accordingly, the current value changes according to the number of electrons e− and ions i+ generated due to the ionization of the molecules constituting the air. The current measurement unit 24 outputs the measured current value to the first measuring instrument 25.

The first measuring instrument 25 converts the current value measured by the current measurement unit 24 into a predetermined measurement value and then transmits the converted value to the controller 40. The number of electrons e− and ions i+ generated due to the ionization of the molecules constituting the air is proportional to the dose of the neutron ray N and the dose of the gamma ray G passing through the chamber body 21. Therefore, the first measuring instrument 25 calculates the measurement value relating to the neutron ray N and the measurement value relating to the gamma ray G, based on the current value measured by the current measurement unit 24. The first measuring instrument 25 calculates an ionization amount as the measurement value by using a known method and outputs the ionization amount to the controller 40. For example, the first measuring instrument 25 converts a generated current into a voltage value by passing the generated current through a predetermined resistor to calculate the ionization amount.

The measurement value includes a first ionization amount that is an ionization amount generated by a reaction between the air and the neutron ray N and a second ionization amount that is an ionization amount generated by a reaction between the air and the gamma ray G. At a stage where the first measuring instrument 25 calculates the measurement value, the first ionization amount and the second ionization amount are not distinguished from each other. The first ionization amount and the second ionization amount are calculated respectively by performing calculation using the measurement value and a detection value described below by the controller 40. The controller 40 may directly receive the detection result from the current measurement unit 24 and internally perform the process performed by the first measuring instrument 25.

The detection unit 30 is a device that detects the neutron ray N. The detection unit 30 calculates the detection value relating to the neutron ray. For example, in the neutron capture therapy apparatus 1, the detection unit 30 is provided on the downstream side of the charged particle beam P from the target 10. The detection unit 30 includes a scintillator 31, an optical fiber 32 whose tip is provided with the scintillator 31, a photodetector 33 that detects light transmitted from the optical fiber 32, and a second measuring instrument 34 that detects the detection value from the detection result by the photodetector 33. The detection unit 30 performs the detection based on the measurement control signal from the controller 40.

The scintillator 31 is a fluorophore that converts an incident neutron ray into light. The scintillator 31 is electrically connected to the optical fiber 32. The scintillator 31 is configured of, for example, $^6$Li. In the scintillator 31, an internal crystal is in an excited state according to a dose of the incident neutron ray, and scintillation light is generated. The measurement of the neutron ray is performed by using the water phantom 26. That is, when the detection unit 30 is irradiated with the neutron ray N from the neutron capture therapy apparatus 1, for example, the neutron ray N is emitted to the same water phantom 26 as the water phantom used in the measurement unit 20. For example, after the measurement process of the neutron ray N and the gamma ray G in the measurement unit 20 ends, the chamber body 21 and the pair of electrodes 22 and 23 are taken out from the water phantom 26, and a part of the scintillator 31 and the optical fiber 32 is disposed at a predetermined position in the water phantom 26. The position of the scintillator 31 in the water phantom 26 may be changed as appropriate according to the progress of the measurement.

The photodetector 33 detects the light emitted by the scintillator 31 via the optical fiber 32. The photodetector 33 outputs a detection result to the second measuring instrument 34. The second measuring instrument 34 converts the detection result from the photodetector 33 into a predetermined detection value. The second measuring instrument 34 transmits the detection value to the controller 40. The detection value is, for example, a neutron count for the neutron ray N. The second measuring instrument 34 counts the number of neutrons as the detection value and outputs the number to the controller 40. The controller 40 may directly receive the detection result from the photodetector 33 and internally perform the process performed by the second measuring instrument 34. The detection unit 30 is configured to include, for example, a 1/v detector. In the 1/v detector, a portion of the scintillator 31 is formed of a 1/v absorber. The details of the 1/v detector will be described below.

The controller 40 controls the entire measuring device 100. The controller 40 includes a processor, a memory, a storage, a communication interface, and a user interface, and is configured as a general computer. The processor is a calculation device such as a central processing unit (CPU). The memory is a storage medium such as a read only memory (ROM) or a random access memory (RAM). The storage is a storage medium such as a hard disk drive (HDD). The communication interface is a communication device that realizes data communication. The user interface is an input device such as a keyboard, a touch panel, or a microphone. The processor integrally controls the memory, the storage, the communication interface, and the user interface to realize a function of the controller 40 described below. In the controller 40, for example, a program stored in the ROM is loaded into the RAM and the program loaded in the RAM is executed by the CPU to realize various functions. The controller 40 may be configured to include a plurality of computers.

The controller 40 includes an acquisition unit 41, a calculation unit 42, and an output unit 43.

The acquisition unit 41 acquires the measurement value and the detection value. The acquisition unit 41 of the present embodiment acquires the measurement value from the measurement unit 20 and acquires the detection value from the detection unit 30. The acquisition unit 41 outputs the measurement value and the detection value to the calculation unit 42. The acquisition unit 41 may acquire, from the storage unit 50, at least one of the measurement value or the detection value stored in the storage unit 50 in advance.

The calculation unit 42 calculates the dose of the gamma ray G based on the measurement value and the detection value acquired by the acquisition unit 41. The calculation unit 42 calculates the dose of the neutron ray N based on the measurement value measured by the measurement unit 20 and the detection value detected by the detection unit 30. First, the calculation unit 42 calculates the first ionization amount. Subsequently, the calculation unit 42 removes the contribution of the first ionization amount from the entire measurement value to calculate the second ionization amount. Subsequently, the calculation unit 42 calculates the dose of the gamma ray G based on the second ionization amount. A calculation method for each value will be described below.

The output unit 43 outputs the dose of the gamma ray G calculated by the calculation unit 42 to the storage unit 50 or the display unit 60. The output unit 43 outputs the dose of the neutron ray N calculated by the calculation unit 42 to the storage unit 50 or the display unit 60. For example, the output unit 43 stores the dose of the gamma ray G and the dose of the neutron ray N in the storage unit 50. For example, the output unit 43 causes the display unit 60 to display the dose of the gamma ray G and the dose of the neutron ray N. The output unit 43 may output the first ionization amount and the second ionization amount to the storage unit 50 or the display unit 60.

The output unit 43 outputs the dose of the gamma ray G to the irradiation controller 18 of the neutron capture therapy apparatus 1. The output unit 43 may output the dose of the neutron ray N to the irradiation controller 18 of the neutron capture therapy apparatus 1.

Hereinafter, the calculation method for each value in the calculation unit 42 will be described in detail. A measurement value $C_{air}$ measured by the measurement unit 20 is the ionization amount of the air in the chamber body 21 by the neutron ray N and the gamma ray G. Therefore, the measurement value $C_{air}$ uses a first ionization amount $C_{neu}$ relating to the neutron ray N and a second ionization amount $C_\gamma$ relating to the gamma ray G to be represented as a sum of the first ionization amount $C_{neu}$ and the second ionization amount $C_\gamma$ as shown in the following equation (1).

$$C_{air} = C_{neu} + C_\gamma \tag{1}$$

A composition of the air filled in the chamber body 21 is configured of nitrogen molecules that occupy about 80% of the air and oxygen molecules that occupy about 20% of the air. An abundance ratio of other compositions in the air is very small compared with the abundance ratio of the nitrogen molecules. Therefore, an ionization amount caused by a reaction between the neutron ray N and the compositions in the air excluding the nitrogen molecule and the oxygen molecule does not need to be taken into consideration due to extremely small influence of the ionization amount on the measurement value $C_{air}$. A neutron cross-sectional area $\sigma_{n(N,p)}$ of the nitrogen atom is 1.930 b (barn), and a neutron cross-sectional area $\sigma_{n(O,p)}$ of the oxygen atom is 189.9 μb (microbarn). For this reason, the neutron cross-sectional area $\sigma_{n(N,p)}$ of the nitrogen atom is much larger than the neutron cross-sectional area $\sigma_{n(O,p)}$ of the oxygen atom. Therefore, the ionization caused by a nuclear reaction between the neutron ray N and the nitrogen molecule is dominant in the ionization of the air by the neutron ray N. That is, the ionization caused by a nuclear reaction between the neutron ray N and the oxygen molecule can be ignored due to very small contribution to the ionization of the air by the neutron ray N. Therefore, in a case where the ionization amount due to the reaction between the neutron ray N and the nitrogen molecule is a nitrogen ionization amount $C_{n(N,p)}$, and the ionization amount due to the reaction between the neutron ray N and the oxygen molecule is an oxygen ionization amount $C_{n(O,p)}$, the first ionization amount $C_{neu}$ is represented by the following equation (2) and is approximated to the nitrogen ionization amount $C_{n(N,p)}$.

$$C_{neu} = C_{n(N,p)} + C_{n(O,p)} \approx C_{n(N,p)} \tag{2}$$

The nitrogen ionization amount $C_{n(N,p)}$ is proportional to a neutron flux $\Phi_{neu}$ as shown in the following equation (3). That is, since the nitrogen ionization amount $C_{n(N,p)}$ is the ionization amount obtained by the reaction between the neutron ray N and the nitrogen molecule, the nitrogen ionization amount is proportional to a value obtained by multiplying the neutron cross-sectional area $\sigma_{n(N,p)}$ of the nitrogen atom by the number of neutrons passing through a predetermined area per second.

$$C_{n(N,p)} \propto \sigma_{n(N,p)} \Phi_{neu} \tag{3}$$

Here, a neutron count R that is a detection value relating to the neutron detected by the detection unit 30 is measured by the detection unit 30 using a nuclear reaction between a nucleus having a cross-sectional area according to a 1/v rule and the neutron. The neutron count R is the number of reactions of the detection unit 30 (the number of times the detection unit 30 detects the neutron (=reacts with the neutron) within measurement time). Here, assuming that the cross-sectional area of the nucleus used in the scintillator 31 of the detection unit 30 is GA, the neutron count R is proportional to a value obtained by multiplying the cross-sectional area GA by the number of neutrons passing through a predetermined area per second, as shown in the following equation (4).

$$R \propto \sigma_A \Phi_{neu} \tag{4}$$

Here, a nucleus of the nitrogen atom also has a cross-sectional area according to the 1/v rule, the same relationship as in the above equation (4) is satisfied. Therefore, the nitrogen ionization amount $C_{n(N,p)}$ is represented by the following equation (5). As shown in equation (5), the nitrogen ionization amount $C_{n(N,p)}$ is proportional to the neutron count R. As shown in equation (2), since the first ionization amount $C_{neu}$ is approximated to the nitrogen ionization amount $C_{n(N,p)}$, the first ionization amount $C_{neu}$ can be regarded as being proportional to the neutron count R.

$$C_{n(N,p)} \propto \frac{\sigma_{n(N,p)} R}{\sigma_A} \tag{5}$$

Therefore, in a case where the detection value (neutron count R) detected by the detection unit 30 and a ratio of the cross-sectional areas of the nucleus of the nitrogen and the nucleus used in the neutron detector are known, the calculation unit 42 can calculate the first ionization amount $C_{neu}$. Therefore, the calculation unit 42 can calculate the second ionization amount $C_\gamma$ by performing subtraction from the measurement value $C_{air}$ of the measurement unit 20. Assuming that a proportional constant is α, the calculation unit 42 can represent the second ionization amount $C_\gamma$ as shown in the following equation (6). The calculation unit 42 calculates the dose of the gamma ray G using the calculated second ionization amount $C_\gamma$. The calculation unit 42 calculates the dose of the gamma ray G by a known method using the second ionization amount $C_\gamma$, for example. The calculation unit 42 calculates the dose of the neutron ray N by a known method using the first ionization amount $C_{neu}$ or the neutron count R, for example.

$$C_\gamma = C_{air} - \frac{\alpha \sigma_{n(N,p)} R}{\sigma_A} \tag{6}$$

Figure 3:
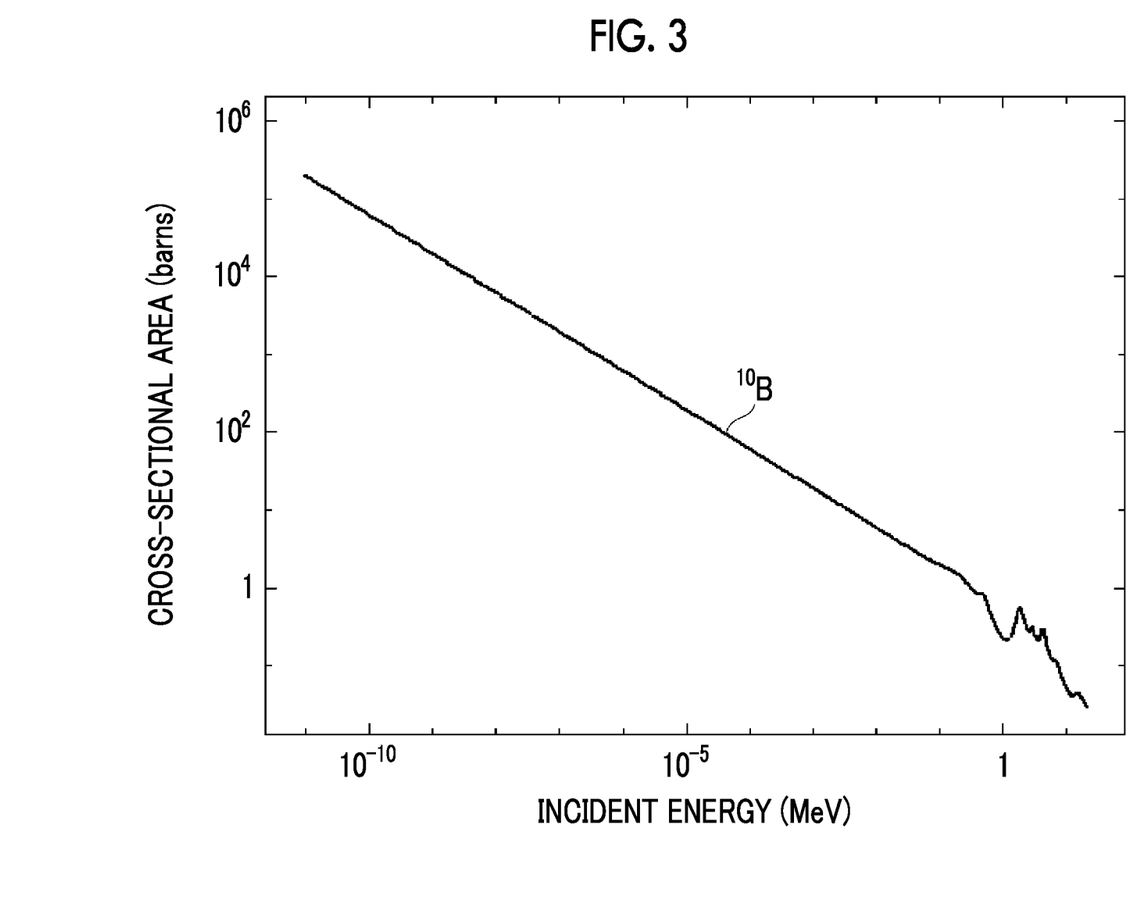
FIG. 3 is a graph showing characteristics of $^{10}B$.

Here, a constraint condition for using the neutron count R will be described. First, in order to accurately calculate the neutron count R, for example, the detection unit 30 is configured to include the 1/v detector as described above. In a case where the 1/v detector is used, the above equation (4) is satisfied. Here, the 1/v absorber is, in a low region where incident energy of the neutron ray is $10^{-4}$ MeV or less, a substance having a relationship that a cross-sectional area thereof decreases in proportion to 1/v. The cross-sectional area according to the 1/v rule refers to a cross-sectional area that decreases in proportion to 1/v. The cross-sectional area here refers to a microscopic cross-sectional area including the above neutron cross-sectional area. That is, the cross-sectional area is a measure representing a rate at which the nuclear reaction occurs. Assuming that a reaction rate (number of reactions per unit time) when the substance is exposed to a single-energy neutron field is Ro and a number density of nuclei of the substance is No, the cross-sectional area is defined by equation (7). Equation (7) shows that the absorber is easier to react with the neutron as the cross-sectional area is larger. "V" indicates the velocity of the neutron. Assuming that mass per neutron is m, v has a relationship indicated by equation (8) with the neutron energy E. The 1/v detector is a detector that uses a nucleus whose cross-sectional area is proportional to 1/v. The proportional relationship between $\sigma$ and 1/v is satisfied and the proportional relationship between v and $E^{1/2}$ is satisfied. Therefore, a proportional relationship between $\sigma$ and $1/E^{1/2}$ is satisfied. For this reason, when the energy on the horizontal axis is plotted with a log, the energy has a linear relationship with the cross-sectional area, which has an inclination of $-\frac{1}{2}$, as shown in FIG. 3.

$$\sigma(E) = \frac{R_0}{N_0 \Phi(E)} \quad (7)$$

$$E = \frac{1}{2}mv^2 \quad (8)$$

Figure 4:
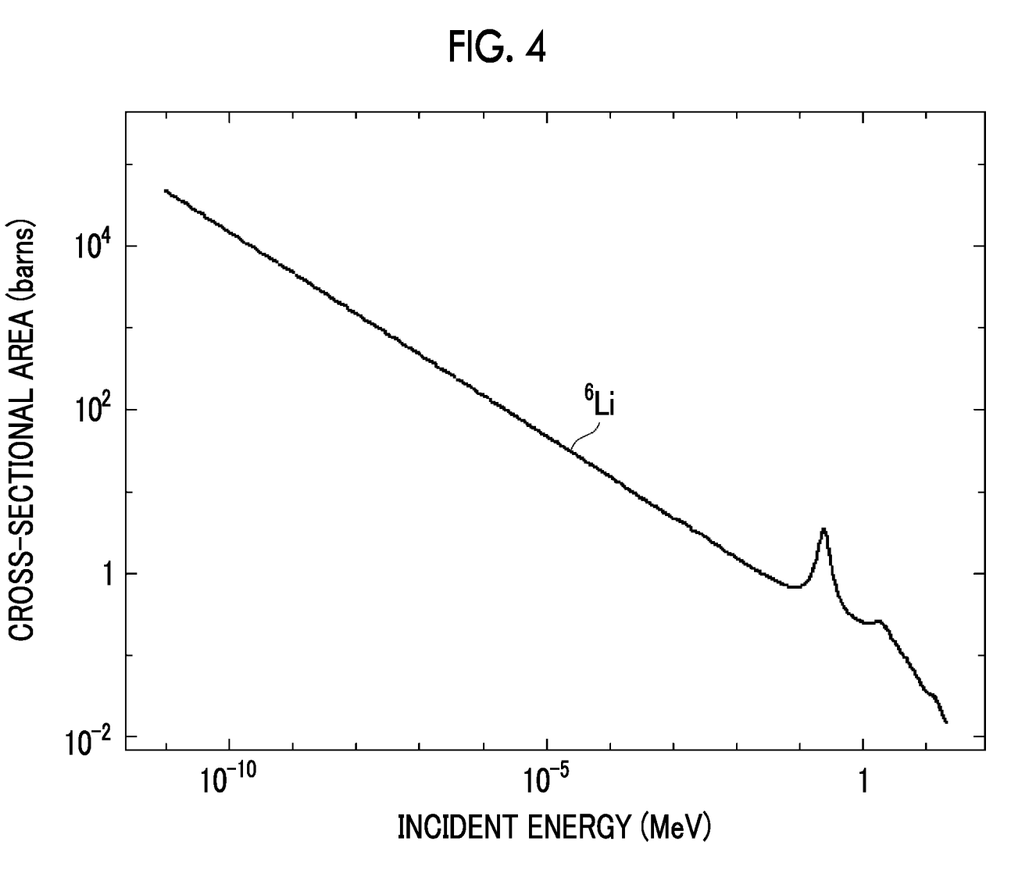
FIG. 4 is a graph showing characteristics of $^{6}Li$.
Figure 5:
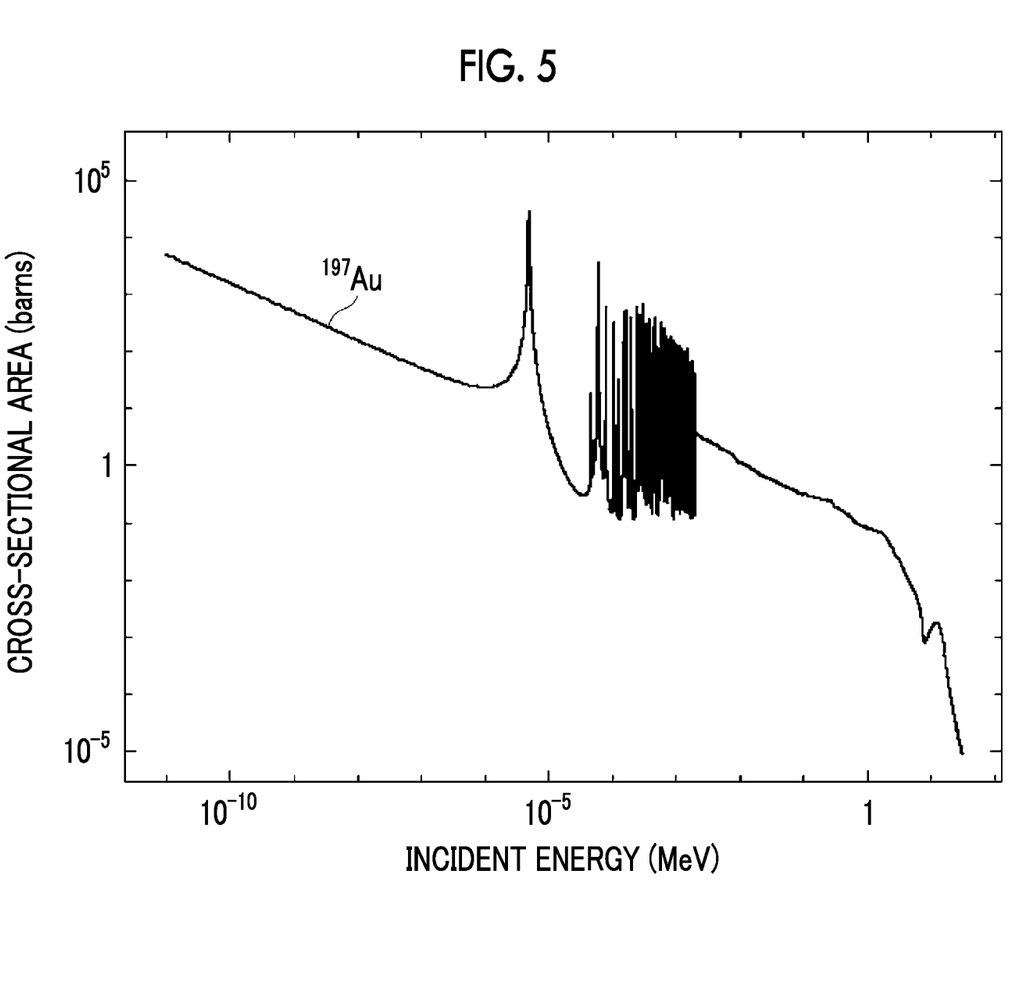
FIG. 5 is a graph showing characteristics of $^{197}Au$.

Examples of such a 1/v absorber include $^{10}B$, $^{6}Li$, $^{14}N$, and $^{3}He$. Specifically, as shown in a graph of FIG. 3 showing characteristics of $^{10}B$ and a graph of FIG. 4 showing characteristics of $^{6}Li$, the cross-sectional areas of these absorbers decrease in proportion to 1/v in the low region where incident energy of the neutron ray is $10^{-4}$ MeV or less. In a high energy region, a deviation occurs from the proportional relationship of 1/v. Thus, in such a region, correction is required when the cross-sectional area is calculated. On the other hand, as shown in a graph of FIG. 5 showing characteristics of $^{197}Au$, the cross-sectional area of the absorber deviates from the proportional relationship of 1/v even in the low region where incident energy of the neutron ray is $10^{-4}$ MeV or less. Accordingly, the absorber such as $^{197}Au$ does not correspond to the 1/v absorber.

An atom of the 1/v absorber used in the detection unit 30 and an atom to be calculated for the number of reactions do not necessarily have to match. For example, even when a 1/v absorber other than $^{10}B$ is used in the detection unit 30, the calculation unit 42 can calculate the number of reactions of $^{10}B$.

As described above, the 1/v absorber needs to be corrected in the high energy region. In order to reduce an amount of the correction, the measurement is preferably performed in the water phantom 26 (refer to FIG. 2). In a case where the measurement is performed in air, the neutron field needs to be sufficiently heated. Accordingly, the measuring device 100 according to the present embodiment is not suitable for detecting an epithermal neutron field. However, since the detection of the neutron count R in the measuring device 100 is performed in the water phantom 26, the constraint condition is not particularly problematic.

A detection head (portion of scintillator 31) of the detection unit 30 is small. Therefore, when a perturbation effect of the neutron field in water (perturbation effect=strain effect×self-shielding effect) is not sufficiently small, uncertainty due to the correction becomes large. The perturbation effect is an effect due to the presence of something other than water at a measurement location. Specifically, it is preferable to suppress the strain effect and the self-shielding effect within a sufficiently small range of 1% or less.

Hereinafter, the irradiation control of the charged particle beam P in the irradiation controller 18 of the neutron capture therapy apparatus 1 will be described. The irradiation controller 18 controls the radiation emission by using the dose of the gamma ray G calculated by the measuring device 100. The irradiation controller 18 may control the radiation emission by using the dose of the neutron ray N calculated by the measuring device 100.

The irradiation controller 18 of the neutron capture therapy apparatus 1 determines, for example, whether or not the dose of the gamma ray G calculated by the measuring device 100 is within a predetermined threshold range. For example, in a case where the dose is within the predetermined threshold range, the neutron capture therapy apparatus 1 ends the measurement by the measuring device 100 and starts the emission to the patient 16.

For example, in a case where the dose is not within the predetermined threshold range, the neutron capture therapy apparatus 1 continues the measurement by the measuring device 100. In this case, the irradiation controller 18 controls (adjusts) the dose of the charged particle beam P emitted from the accelerator 2 based on, for example, the dose of the gamma ray G calculated by the measuring device 100. In a case where the accelerator 2 emits the charged particle beam P controlled by the irradiation controller 18, the measuring device 100 measures the radiation including the neutron ray N and the gamma ray G again to calculate an updated dose of the gamma ray G.

The neutron capture therapy apparatus 1 can receive feedback on each dose from the measuring device 100 until the dose of the gamma ray G is within the predetermined threshold range. The neutron capture therapy apparatus 1 may receive the feedback on each dose from the measuring device 100 until the dose of the neutron ray N is within the predetermined threshold range.

Figure 6:
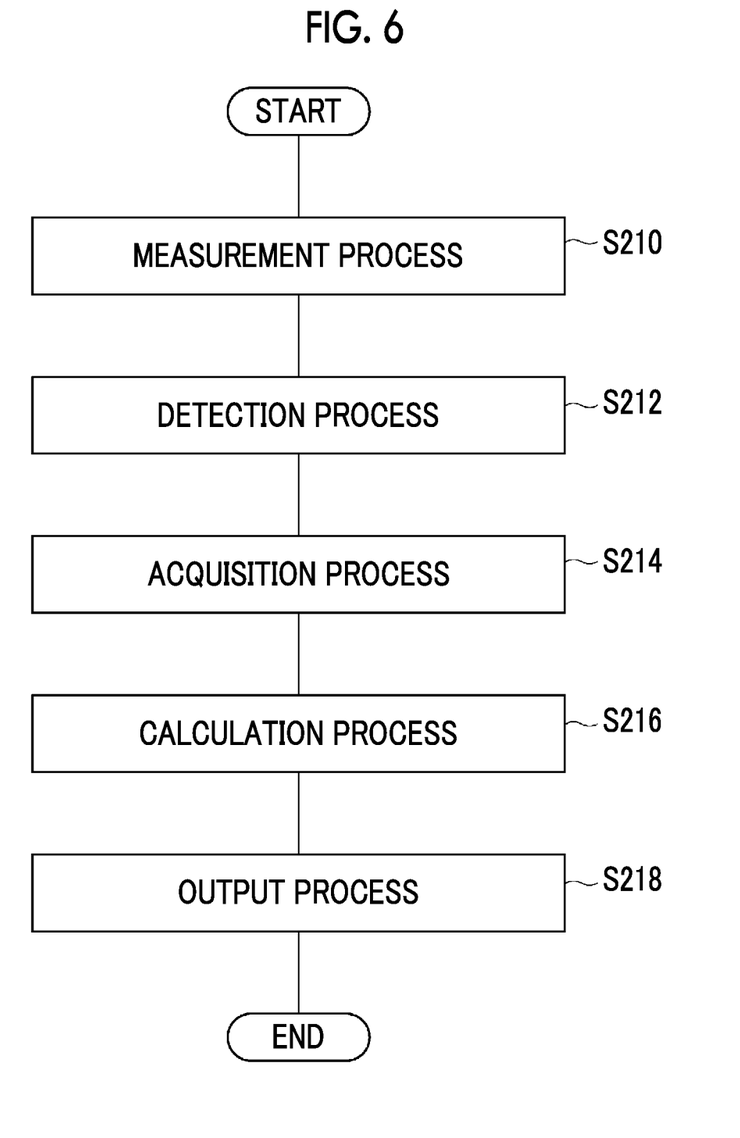
FIG. 6 is a flowchart showing a process content of a neutron ray measuring method.

Next, a procedure of a measuring method according to the present embodiment will be described with reference to FIG. 6. FIG. 6 is a flowchart showing a process content of a neutron ray measuring method. The flowchart shown in FIG. 6 is started, for example, in a case where the charged particle beam P is emitted from the neutron capture therapy apparatus 1 and the measurement unit 20 receives the measurement control signal from the controller 40. First, the measurement unit 20 measures the measurement value $C_{air}$ as the measurement process (step S210). When the radiation including the neutron ray N and the gamma ray G is emitted from the neutron capture therapy apparatus 1 to the chamber body 21 in the water phantom 26, the current measurement unit 24 measures the current value generated between the pair of electrodes 22 and 23. The first measuring instrument 25 calculates the measurement value $C_{air}$ (ionization amount) based on the current value obtained by the current measurement unit 24 and outputs the measurement value $C_{air}$ to the controller 40.

Subsequently, the detection unit 30 detects the neutron count R, which is the detection value, as the detection process (step S212). When the neutron ray N is emitted from the neutron capture therapy apparatus 1 to the scintillator 31 in the water phantom 26, the photodetector 33 detects the light emitted by the scintillator 31. Even in a case where the gamma ray G is emitted to the scintillator 31 from the neutron capture therapy apparatus 1, the influence of the gamma ray G can be ignored because the value of the neutron count R in the scintillator 31 is not significantly affected. The second measuring instrument 34 calculates the neutron count R based on the detection result obtained by the photodetector 33 and outputs the neutron count R to the controller 40.

Subsequently, the acquisition unit 41 of the controller 40 acquires the measurement value $C_{air}$ and the detection value (neutron count R), as an acquisition process (step S214). The acquisition unit 41 acquires the measurement value $C_{air}$ from the measurement unit 20. The acquisition unit 41 acquires the neutron count R from the detection unit 30. The acquisition unit 41 outputs the measurement value $C_{air}$ and the detection value (neutron count R) to the calculation unit 42.

Subsequently, the calculation unit 42 of the controller 40 calculates the dose of the gamma ray, as a calculation process (step S216). The calculation unit 42 calculates the first ionization amount $C_{neu}$ based on the neutron count R. The calculation unit 42 calculates the second ionization amount $C_\gamma$ based on the measurement value $C_{air}$ and the first ionization amount $C_{neu}$. The calculation unit 42 calculates the dose of the gamma ray G based on the second ionization amount $C_\gamma$. The calculation unit 42 calculates the dose of the neutron ray N based on the first ionization amount $C_{neu}$. The calculation unit 42 outputs the dose of the gamma ray G and the dose of the neutron ray N to the output unit 43.

Subsequently, the output unit 43 of the controller 40 outputs the dose of the gamma ray G and the dose of the neutron ray N to the storage unit 50 or the display unit 60, as an output process (step S218). For example, the output unit 43 stores the dose of the gamma ray G and the dose of the neutron ray N in the storage unit 50. For example, the output unit 43 causes the display unit 60 to display the dose of the gamma ray G and the dose of the neutron ray N.

Figure 7:
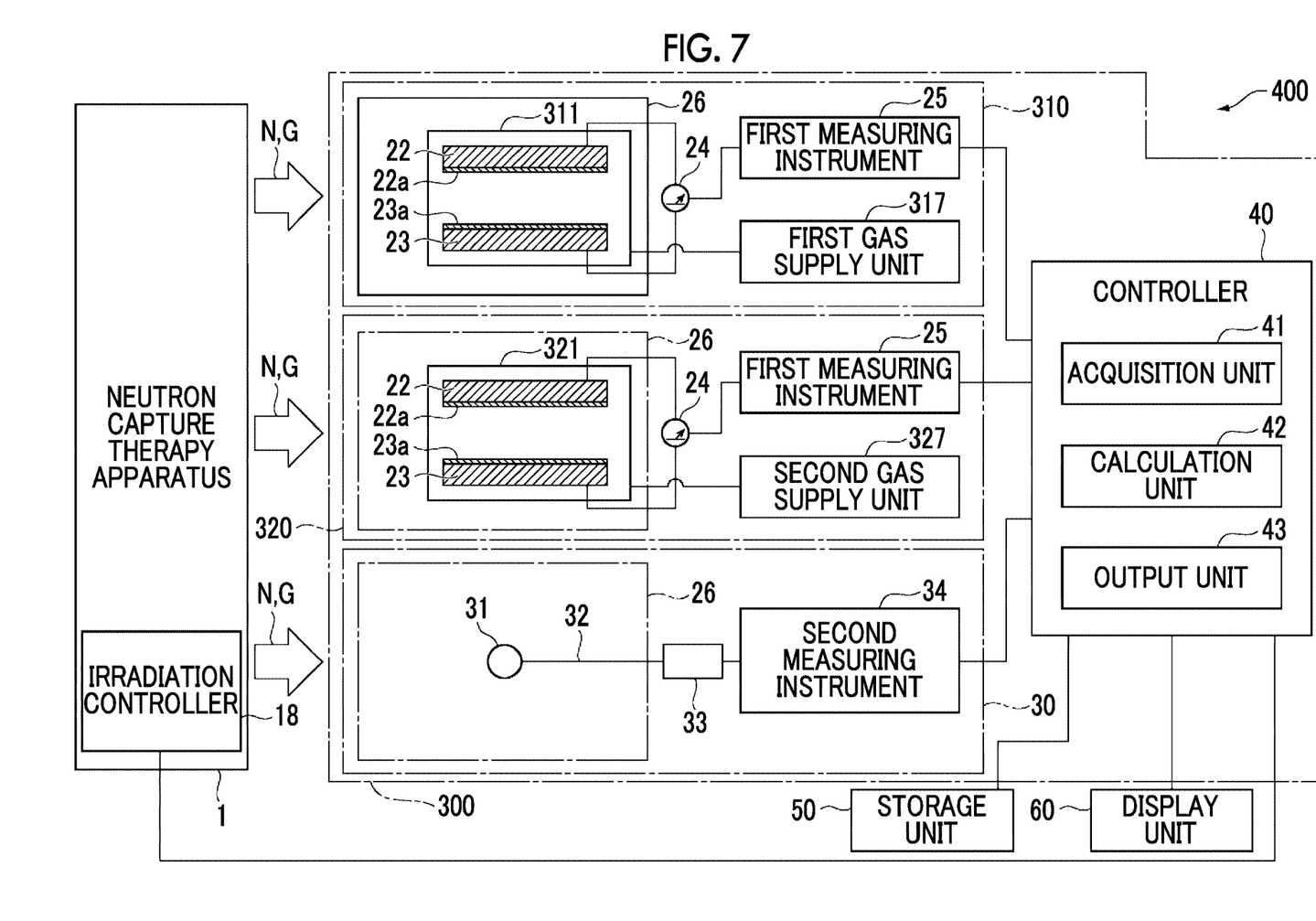
FIG. 7 is a block diagram of a measuring system and a measuring device according to a comparative example.

Next, an action and effect of the measuring device 100 according to the present embodiment will be described while comparing with a measuring device 300 according to a comparative example. In a case where a name and a symbol of a device or a functional unit in the measuring device 300 of the comparative example are the same as the name and the symbol of the device or the functional unit in the measuring device 100 of the above embodiment, the device or the functional unit in the measuring device 300 has the same function as the device or the functional unit in the measuring device 100.

FIG. 7 is a block diagram of a measuring system and a measuring device according to the comparative example. As shown in FIG. 7, a measuring system 400 includes the neutron capture therapy apparatus 1 and the measuring device 300. The measuring device 300 includes a first gas measurement unit 310, a second gas measurement unit 320, the detection unit 30, and the controller 40. The measuring device 300 of the comparative example calculates the dose of the neutron ray N and the dose of the gamma ray G. The first gas measurement unit 310 includes a chamber body 311 whose inside is filled with a first gas, the pair of electrodes 22 and 23, the current measurement unit 24, the first measuring instrument 25, and a first gas supply unit 317 that supplies the first gas to the inside of the chamber body 311. The chamber body 311 is provided inside the water phantom 26. The first gas filled inside the chamber body 311 is, for example, carbon dioxide gas. The first gas is supplied from the first gas supply unit 317 through a gas pipe. The first gas supply unit 317 is, for example, a gas tank. The pair of electrodes 22 and 23 is provided inside the chamber body 311.

The second gas measurement unit 320 includes a chamber body 321 whose inside is filled with a second gas, the pair of electrodes 22 and 23, the current measurement unit 24, the first measuring instrument 25, and a second gas supply unit 327 that supplies the second gas to the inside of the chamber body 321. The chamber body 321 is provided inside the water phantom 26. A type of the second gas filled inside the chamber body 321 is different from that of the first gas. The second gas is, for example, a gas in which methane gas, carbon dioxide gas, and nitrogen gas are mixed. The second gas is supplied from the second gas supply unit 327 through a gas pipe. The second gas supply unit 327 is, for example, a gas tank. The pair of electrodes 22 and 23 is provided inside the chamber body 321.

The neutron ray N from the neutron capture therapy apparatus 1 to the second gas measurement unit 320 is emitted, for example, to the same water phantom 26 as the water phantom used in the first gas measurement unit 310. For example, after the measurement of the neutron ray N and the gamma ray G by the first gas measurement unit 310 ends, the chamber body 311 and the pair of electrodes 22 and 23 provided inside the chamber body 311 are taken out from the water phantom 26. Next, the chamber body 321 and the pair of electrodes 22 and 23 provided inside the chamber body 321 are disposed at predetermined positions in the water phantom 26. Further, the neutron ray N from the neutron capture therapy apparatus 1 to the detection unit 30 of the measuring device 300 is also emitted, for example, to the same water phantom 26 as the water phantom used in the first gas measurement unit 310. For example, after the measurement of the neutron ray N and the gamma ray G in the second gas measurement unit 320 ends, the chamber body 321 and the pair of electrodes 22 and 23 provided inside the chamber body 321 are taken out from the water phantom 26. Next, a part of the scintillator 31 and the optical fiber 32 is disposed at a predetermined position in the water phantom 26.

The first gas measurement unit 310 and the second gas measurement unit 320 provided in the measuring device 300 have different sensitivities since types of gases flowing into the first gas measurement unit 310 and the second gas measurement unit 320 are different from each other. The measuring device 300 calculates the dose of the gamma ray G by using the measurement value obtained by the first gas measurement unit 310 and the measurement value obtained by the second gas measurement unit 320. That is, in order to calculate the dose of the gamma ray G in the measuring device 300, there is a need for a total of two measurement processes including the measurement process in the first gas measurement unit 310 and the measurement process in the second gas measurement unit 320. Further, the measuring device 300 calculates the dose of the neutron ray N using the detection value in the detection unit 30. That is, in order to calculate the dose of the neutron ray N in the measuring device 300, there is a need for one detection process in the detection unit 30. Accordingly, in order to calculate, in the measuring device 300 of the comparative example, the dose of the gamma ray G and the dose of the neutron ray N in the neutron capture therapy apparatus 1, there is a need for a total of three processes including the measurement process in the first gas measurement unit 310, the measurement process in the second gas measurement unit 320, and the detection process in the detection unit 30.

In the measuring device 100 of the present embodiment, with the total of two processes including the measurement process in the measurement unit 20 and the detection process in the detection unit 30, it is possible to calculate the dose of the gamma ray G and the dose of the neutron ray N. Therefore, the measuring device 100 of the present embodiment can reduce the number of processes up to the calculation of the dose of the gamma ray G and the dose of the neutron ray N and thus can easily calculate the dose, as compared with the measuring device 300 of the comparative example.

Further, the first gas measurement unit 310 and the second gas measurement unit 320 of the measuring device 300 of the comparative example need to have different sensitivities in order to calculate the dose of the gamma ray G. Therefore, in the measuring device 300, the first gas supplied to the first gas measurement unit 310 and the second gas supplied to the second gas measurement unit 320 need to be different types of gases. Accordingly, in order to obtain the dose of the gamma ray G in the measuring device 300, the first gas supply unit 317 and the second gas supply unit 327 need to be provided respectively.

On the other hand, in the measurement unit 20 of the measuring device 100 of the present embodiment, the inside of the chamber body 21 is exposed to the atmosphere and thus it is not necessary to provide a facility for filling the chamber body 21 with gas. Even in a case where the facility is provided, it is sufficient to provide only a facility for filling the chamber body 21 with one type of gas (air). Therefore, the measuring device 100 of the present embodiment can reduce the cost and manpower for providing the facility for filling the gas and thus can easily execute the processes up to the calculation of the dose of the gamma ray G and the dose of the neutron ray N, as compared with the measuring device 300 of the comparative example.

As described above, the measuring device 100 calculates the dose of the gamma ray G based on the measurement value $C_{air}$ relating to the radiation including the neutron ray N and the gamma ray G measured by the measurement unit 20, having the chamber body 21 (ionization chamber) containing the air inside, and the neutron count R (detection value) relating to the neutron ray N detected by the detection unit 30 (detector).

The measuring device 100 of the present embodiment calculates the dose of the gamma ray G based on the measurement value $C_{air}$ relating to the radiation including the neutron ray N and the gamma ray G measured by the measurement unit 20 and the neutron count R detected by the detection unit 30. Since the measurement value $C_{air}$ is measured in the chamber body 21 containing the air, the measurement value $C_{air}$ is easily measured without separately providing the facility for filling the inside of the chamber body 21 with gas. Further, the measuring device 100 can remove the influence of the first ionization amount $C_{neu}$, which is the value relating to the neutron ray N, from the measurement value $C_{air}$ by using the neutron count R. As described above, the measuring device 100 can easily measure the dose of the gamma ray G. Further, the measuring device 100 can easily measure the dose of the neutron ray N as well. That is, it is possible to appropriately and easily calculate the dose of the gamma ray G and the dose of the neutron ray N for ensuring the quality of emitted beam in the neutron capture therapy apparatus 1.

The measurement value $C_{air}$ includes the first ionization amount $C_{neu}$ due to the reaction between the air in the chamber body 21 and the neutron ray N and the second ionization amount $C_\gamma$ due to the reaction between the air in the chamber body 21 and the gamma ray G, and the dose of the gamma ray G is calculated based on the second ionization amount $C_\gamma$. In this case, it is possible to derive the second ionization amount $C_\gamma$ based on the measurement value $C_{air}$, the first ionization amount $C_{neu}$, and the neutron count R, and thus appropriately measure the dose of the gamma ray G.

The detection value is the neutron count R relating to the neutron ray N, and the first ionization amount $C_{neu}$ is approximated to the nitrogen ionization amount $C_{n(N,p)}$, which is the ionization amount due to the reaction between the nitrogen contained in the air in the chamber body 21 and the neutron ray N. In this case, since the first ionization amount $C_{neu}$ can be regarded as being proportional to the neutron count R, the first ionization amount $C_{neu}$ is calculated based on the neutron count R. Accordingly, it is possible to derive the second ionization amount $C_\gamma$ by removing the first ionization amount $C_{neu}$ from the measurement value $C_{air}$ and thus appropriately measure the dose of the gamma ray G.

As shown in equation (6), the measuring device 100 of the present embodiment can calculate the second ionization amount $C_\gamma$ without using the neutron flux $\Phi_{neu}$. In a case where the second ionization amount $C_\gamma$ is calculated by using the neutron flux $\Phi_{neu}$ having energy distribution, the calculation becomes complicated since energy integration between the cross-sectional area of the neutron and the neutron flux $\Phi_{neu}$ is required. Thus, the accuracy of the calculated second ionization amount $C_\gamma$ may be low. Accordingly, with the calculation of the second ionization amount $C_\gamma$ using a calculation formula that does not include the neutron flux $\Phi_{neu}$ by the calculation unit 42, it is possible to improve the accuracy of the second ionization amount $C_\gamma$.

A measuring method according to another aspect of the present disclosure has a step (step S216) of calculating the dose of the gamma ray G based on the measurement value $C_{air}$ relating to the radiation including the neutron ray N and the gamma ray G measured by the measurement unit 20, having the chamber body 21 (ionization chamber) containing the air inside, and the neutron count R (detection value) relating to the neutron ray N detected by the detection unit 30 (detector).

According to this measuring method, it is possible to obtain the same action and effect as those of the above measuring device 100.

The measuring system 200 according to another aspect of the present disclosure includes the neutron capture therapy apparatus 1 (radiation therapy apparatus) that emits the radiation (charged particle beam P) including the neutron ray N and the gamma ray G and the measuring device 100 that calculates, based on the measurement value $C_{air}$ relating to the radiation measured in the chamber body 21 (ionization chamber) containing the air inside and the neutron count R (detection value) relating to the neutron ray N detected by the detection unit 30 (detector), the dose of the gamma ray G emitted from the neutron capture therapy apparatus 1.

According to the measuring system 200, in the measuring device 100, the dose of the gamma ray G is calculated based on the measurement value $C_{air}$ relating to the radiation (charged particle beam P) emitted from the neutron capture therapy apparatus 1 and the neutron count R relating to the neutron ray N emitted from the neutron capture therapy apparatus 1. Since the measurement value $C_{air}$ is measured in the chamber body 21 containing the air, the measurement value $C_{air}$ is easily measured without separately providing the facility for filling the chamber body 21 with gas. Further, the measuring device 100 can remove the influence of the value relating to the neutron ray N from the measurement value $C_{air}$ by using the neutron count R. As described above, the measuring system 200 can easily measure the dose of the gamma ray G of the neutron capture therapy apparatus 1 by the measuring device 100. Further, the measuring system 200 can easily measure the dose of the neutron ray N of the neutron capture therapy apparatus 1 by the measuring device 100.

The measuring system 200 (example of radiation therapy system) according to another aspect of the present disclosure includes the neutron capture therapy apparatus 1 (radiation therapy apparatus) that emits the radiation (charged particle beam P) including the neutron ray N and the gamma ray G and the measuring device 100 that calculates, based on the measurement value $C_{air}$ relating to the radiation measured in the chamber body 21 (ionization chamber) containing the air inside and the neutron count R (detection value) relating to the neutron ray N detected by the detection unit 30 (detector), the dose of the gamma ray G emitted from the neutron capture therapy apparatus 1, and the radiation therapy apparatus controls the radiation emission using the dose of the gamma ray calculated by the measuring device.

According to the measuring system 200, the neutron capture therapy apparatus 1 uses at least one of the dose of the neutron ray N or the dose of the gamma ray G accurately calculated by the measuring device 100 to control the emission of the radiation including the neutron ray N and the gamma ray G, and thus can emit, to the patient 16, an appropriate dose of radiation. Further, the neutron capture therapy apparatus 1 can suppress emission, to the patient 16, of radiation including at least one of the neutron ray N or the gamma ray G having a dose exceeding a predetermined threshold.

The present disclosure is not limited to the above embodiment.

In the above embodiment, the calculation unit 42 calculates the dose of the neutron ray N, but may not calculate the dose of the neutron ray N. The measuring device 100 may not include at least one of the measurement unit 20 or the detection unit 30. When the measuring device 100 does not include the measurement unit 20, the acquisition unit 41 may acquire the measurement value $C_{air}$ stored in advance in the storage unit 50 from the storage unit 50. When the measuring device 100 does not include the detection unit 30, the acquisition unit 41 may acquire the neutron count R (detection value) stored in advance in the storage unit 50 from the storage unit 50.

The measuring device 100 can apply a detector other than the scintillator as the detection unit 30. For example, as a detector that counts the number of neutrons, a proportional counter tube using a gas of $^3$He, a proportional counter tube on which $^{10}$B is deposited, or the like may be applied. The detection method is not particularly limited, but a type that counts the neutron is preferable.

In the measuring device 100, the chamber body 21 and the scintillator 31 may be provided in the same water phantom. The position of the chamber body 21 and the position of the scintillator 31 may be randomly determined in the water phantom. Accordingly, with the emission of the neutron ray N and the gamma ray G from the neutron capture therapy apparatus 1 to the water phantom, it is possible to acquire both the measurement value and the detection value. In this case, the measurement process (S210) and the detection process (S212) may be executed in parallel.

Further, the detection process (S212) may be executed before the measurement process (S210). In this case, for example, when the detection of the neutron ray N in the detection unit 30 ends, a part of the scintillator 31 and the optical fiber 32 may be taken out from the water phantom 26, and the chamber body 21 and the pair of electrodes 22 and 23 may be disposed at a predetermined position within the water phantom 26.

In the measuring system 200, the measuring device 100 may output the dose of the gamma ray G and the dose of the neutron ray N to a calibration device (not shown). The calibration device is a device that acquires an estimated value relating to fluence of the neutron ray N in the neutron capture therapy apparatus 1, compares the value with the measurement result of the measuring device 100, and calibrates the estimated value. In the measuring system 200, the calibration device may be connected to a therapy planning device (not shown) included in the measuring system 200. In this case, the calibration device transmits the estimated value to the therapy planning device. The therapy planning device is a device that performs a therapy plan of how to emit, to a patient, the neutron ray N when the therapy is performed by using the neutron capture therapy apparatus 1. That is, with the calibration of the estimated value relating to the fluence of the neutron ray N in the neutron capture therapy apparatus 1 based on the result (dose of neutron ray N or dose of gamma ray G) obtained by the measuring device 100, the measuring system 200 can set an appropriate therapy plan in the neutron capture therapy apparatus 1.

It should be understood that the invention is not limited to the above-described embodiment, but may be modified into various forms on the basis of the spirit of the invention. Additionally, the modifications are included in the scope of the invention.

What is claimed is:

1. A measuring device comprising:
   an ionization chamber where air is contained and a measurement value relating to radiation including a neutron ray and a gamma ray is measured;
   a detector that detects a detection value relating to the neutron ray; and
   a controller that calculates a dose of the gamma ray based on the measurement value measured in the ionization chamber and the detection value detected by the detector,
   wherein the measurement value includes a first ionization amount due to a reaction between the air in the ionization chamber and the neutron ray and a second ionization amount due to a reaction between the air in the ionization chamber and the gamma ray, and
   the controller is configured to
      remove a contribution of the first ionization amount from the measurement value to calculate the second ionization amount, and
      calculate the dose of the gamma ray based on the second ionization amount.

2. The measuring device according to claim 1,
   wherein the detection value is a neutron count relating to the neutron ray, and
   the first ionization amount is approximated, by the controller, to an ionization amount due to a reaction between nitrogen contained in the air in the ionization chamber and the neutron ray.

3. The measuring device according to claim 1,
   wherein the ionization chamber includes a pair of electrodes provided so as to face each other inside the ionization chamber.

4. The measuring device according to claim 3,
   wherein the pair of electrodes is formed of a thin metal plate, and facing surfaces of the pair of electrodes are covered with films.

5. The measuring device according to claim 3,
wherein the ionization chamber includes a current measurement unit electrically connected to the pair of electrodes, and
the current measurement unit measures a current value applied between the pair of electrodes.

6. The measuring device according to claim 5,
wherein the current measurement unit outputs the measured current value to a first measuring instrument, and the first measuring instrument calculates the first ionization amount and the second ionization amount based on the current value measured by the current measurement unit.

7. The measuring device according to claim 1,
wherein the detector includes a scintillator and an optical fiber whose tip is provided with the scintillator, and the scintillator is electrically connected to the optical fiber.

8. The measuring device according to claim 7,
wherein the detector further includes a photodetector and a second measuring instrument, and the photodetector detects light emitted by the scintillator via the optical fiber and outputs a detection result to the second measuring instrument.

9. The measuring device according to claim 1,
wherein the controller includes an acquisition unit that acquires the measurement value and the detection value, a calculation unit that calculates doses of the gamma ray and the neutron ray based on the measurement value and the detection value acquired by the acquisition unit, and an output unit that outputs the doses of the gamma ray and the neutron ray calculated by the calculation unit.

10. A measuring method comprising:
calculating, based on a measurement value relating to radiation including a neutron ray and a gamma ray, which is measured in an ionization chamber containing air inside, and a detection value relating to the neutron ray, which is detected by a detector, a dose of the gamma ray,
wherein the measurement value includes a first ionization amount due to a reaction between the air in the ionization chamber and the neutron ray and a second ionization amount due to a reaction between the air in the ionization chamber and the gamma ray,
the first ionization amount is calculated by removing a contribution of the first ionization amount from the measurement value, and
the dose of the gamma ray is calculated based on the second ionization amount.

11. A measuring system comprising:
a radiation therapy apparatus that emits radiation including a neutron ray and a gamma ray; and
a measuring device including
an ionization chamber where air is contained and a measurement value relating to the radiation including the neutron ray and the gamma ray is measured,
a detector that detects a detection value relating to the neutron ray, and
a controller that calculates a dose of the gamma ray based on the measurement value measured in the ionization chamber and the detection value detected by the detector,
wherein the measurement value includes a first ionization amount due to a reaction between the air in the ionization chamber and the neutron ray and a second ionization amount due to a reaction between the air in the ionization chamber and the gamma ray, and
the controller is configured to
remove a contribution of the first ionization amount from the measurement value to calculate the second ionization amount, and
calculate the dose of the gamma ray based on the second ionization amount.

12. A radiation therapy system comprising:
a radiation therapy apparatus that emits radiation including a neutron ray and a gamma ray; and
a measuring device including
an ionization chamber where air is contained and a measurement value relating to the radiation including the neutron ray and the gamma ray is measured,
a detector that detects a detection value relating to the neutron ray, and
a controller that calculates a dose of the gamma ray based on the measurement value measured in the ionization chamber and the detection value detected by the detector,
wherein the measurement value includes a first ionization amount due to a reaction between the air in the ionization chamber and the neutron ray and a second ionization amount due to a reaction between the air in the ionization chamber and the gamma ray,
the controller is configured to
remove a contribution of the first ionization amount from the measurement value to calculate the second ionization amount, and
calculate the dose of the gamma ray based on the second ionization amount, and
the radiation therapy apparatus controls the emission of the radiation by using the dose of the gamma ray calculated by the controller.

\* \* \* \* \*